United States Patent
Newstadt et al.

(10) Patent No.: US 8,903,986 B1
(45) Date of Patent: Dec. 2, 2014

(54) REAL-TIME IDENTIFICATION OF URLS ACCESSED BY AUTOMATED PROCESSES

(75) Inventors: Keith Newstadt, Newton, MA (US); Adam Schepis, Milford, MA (US)

(73) Assignee: Symantec Corporation, Mountain View, CA (US)

( * ) Notice: Subject to any disclaimer, the term of this patent is extended or adjusted under 35 U.S.C. 154(b) by 1145 days.

(21) Appl. No.: 12/754,378

(22) Filed: Apr. 5, 2010

(51) Int. Cl.
*G06F 15/16* (2006.01)
*G06F 15/173* (2006.01)

(52) U.S. Cl.
USPC ........... 709/224; 709/217; 709/219; 709/223; 709/225

(58) Field of Classification Search
USPC .................................. 709/217, 219, 223–225
See application file for complete search history.

(56) References Cited

U.S. PATENT DOCUMENTS

| | | | | |
|---|---|---|---|---|
| 7,860,870 | B2 * | 12/2010 | Sadagopan et al. | 707/748 |
| 2008/0086522 | A1 * | 4/2008 | Biggs et al. | 709/202 |
| 2008/0120413 | A1 * | 5/2008 | Mody et al. | 709/226 |
| 2008/0281606 | A1 * | 11/2008 | Kitts et al. | 705/1 |
| 2008/0301090 | A1 * | 12/2008 | Sadagopan et al. | 707/3 |
| 2008/0306830 | A1 * | 12/2008 | Lasa et al. | 705/26 |

OTHER PUBLICATIONS

A. Basso. Protecting Web resources from massive automated access. Technical report RT114/08—Computer Science Department, University of Torino, 2008.*

* cited by examiner

*Primary Examiner* — Edward Kim
(74) *Attorney, Agent, or Firm* — Brill Law Office; Jeffrey Brill

(57) ABSTRACT

Outbound network traffic originating from a client computer is monitored, and requests to access URLs in the outbound network traffic are detected. Detected requests to access URLs are compared to each of a plurality of rules, in order to determine whether specific ones of the detected requests were initiated automatically by a process or manually by a human user. Where a rule of the plurality applies to a detected request, a rating concerning the request is adjusted. The rating indicates a likelihood as to whether the request was initiated automatically or manually. Depending upon whether the rating concerning the request reaches a threshold, the request is categorized as being either automatically initiated by a process, or manually initiated by a human user. Only those requests categorized as being manually initiated by a human user are logged.

18 Claims, 6 Drawing Sheets

REAL-TIME IDENTIFICATION OF URLS ACCESSED BY AUTOMATED PROCESSES

TECHNICAL FIELD

This disclosure pertains generally to computer content monitoring applications, and more specifically to distinguishing in real-time between URLs visited manually by a user and URLs visited automatically by an automated process.

BACKGROUND

Parental control systems and other content monitoring applications monitor a client computer's network traffic, and log each request from the client computer to access a Uniform Resource Locator ("URL") on the internet by issuing a Hypertext Transfer Protocol ("HTTP") request. The purpose of this URL logging is to track and monitor the user's internet activity. However, the user does not necessarily initiate, or even know about, every HTTP request generated by the client computer. Many applications use HTTP requests to automatically contact internet servers to check for updates, synchronize data, upload statistics, etc. Content monitoring applications that monitor network traffic and log attempts to access URLs log not only HTTP requests generated by the user, but also these automatically generated requests. For example, a content monitoring application that logs all HTTP requests will log not only actual user browsing activity, but also automatic activity such as, for example, a Google toolbar plug-in querying for autocomplete strings. When such content monitoring applications log automatically generated HTTP requests, this not only puts an unnecessary load on the logging system, but obscures the actual user activity, losing the user's browsing patterns in the automatically generated noise.

Some content monitoring applications attempt to filter automatically generated requests out of the logs using blacklists that are shipped with the application or downloaded to the client. However, it is difficult and time consuming to maintain these blacklists. In the ever-changing internet world, they are always out-of-date and incomplete.

Other content monitoring applications avoid the issue of logging automatically generated HTTP requests by monitoring at the browser plug-in level rather than the network traffic level. Such applications thus avoid capturing automatically requested URLs. However, by monitoring at the browser plug-in level, these applications allow the user to easily avoid being monitored by simply using an unsupported browser. This approach results in a weak monitoring solution.

It would be desirable to address these issues.

SUMMARY

A URL access management system distinguishes between requests to access URLs that are made automatically by processes and those that are made manually by human users. Outbound network traffic originating from a client computer is monitored, and requests to access URLs in the outbound network traffic are detected. Detected requests to access URLs are compared to each of a plurality of rules, in order to determine whether specific ones of the detected requests were initiated automatically by a computerized process or manually by a human user. Where a rule of the plurality applies to a specific detected request, a rating concerning the specific detected request is adjusted. The rating indicates a likelihood as to whether the specific detected request was initiated automatically or manually. More specifically, the rating concerning a specific detected request can be adjusted according to rules based on factors such as the rate at which the URL of the specific detected request is being accessed over time, the number of URLs that have been accessed within a given time period by the client computer, the human user of the client computer being idle at the time of the specific detected request, the source of the specific detected request and/or the response to the specific detected request. Depending upon whether the rating concerning the specific detected request reaches a threshold, the specific detected request is categorized as being either automatically initiated by a process, or manually initiated by a human user. Thus, as requests are detected and processed over time, some detected requests are categorized as being initiated automatically, and others are categorized as being initiated manually. Only those requests categorized as being manually initiated by a human user are logged.

In some embodiments, where a detected request is categorized as being initiated automatically by a process, the request is transmitted to a central server for analysis. At the central server level, data concerning categorized requests is received from a plurality of client computers and amalgamated. Based on this data concerning categorized requests amalgamated from the plurality of client computers, rules can be modified in response to one or more patterns detected over time in requests to access URLs. New rules can also be automatically generated responsive to the amalgamated data. Additionally, the amalgamated data can be used to create blacklists and/or whitelists of categorized URLs. New rules, modified rules, blacklists and/or whitelists can be distributed to the plurality of client computers.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
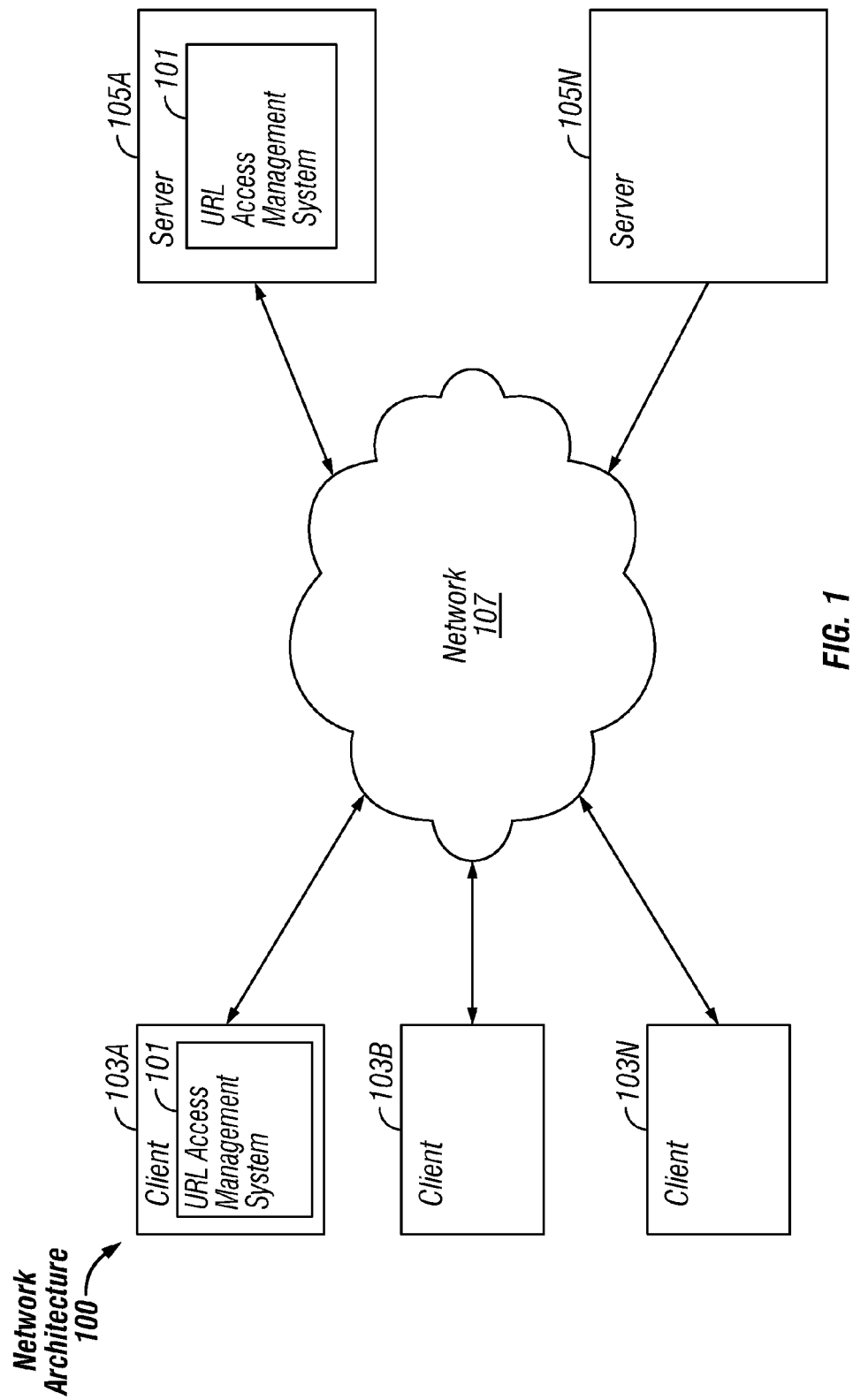
FIG. 1 is a block diagram of an exemplary network architecture in which a URL access management system can be implemented, according to some embodiments.

FIG. 1 is a block diagram illustrating an exemplary network architecture 100 in which a URL access management system 101 can be implemented. The illustrated network architecture 100 comprises multiple clients 103A, 103B and 103N, as well as multiple servers 105A and 105N. In FIG. 1, the URL access management system 101 is illustrated as residing on client 103A and server 105A. It is to be understood that this is an example only, and in various embodiments various functionalities of this system 101 can be instantiated on a client 103, a server 105 or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applicants and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments.

Figure 2:
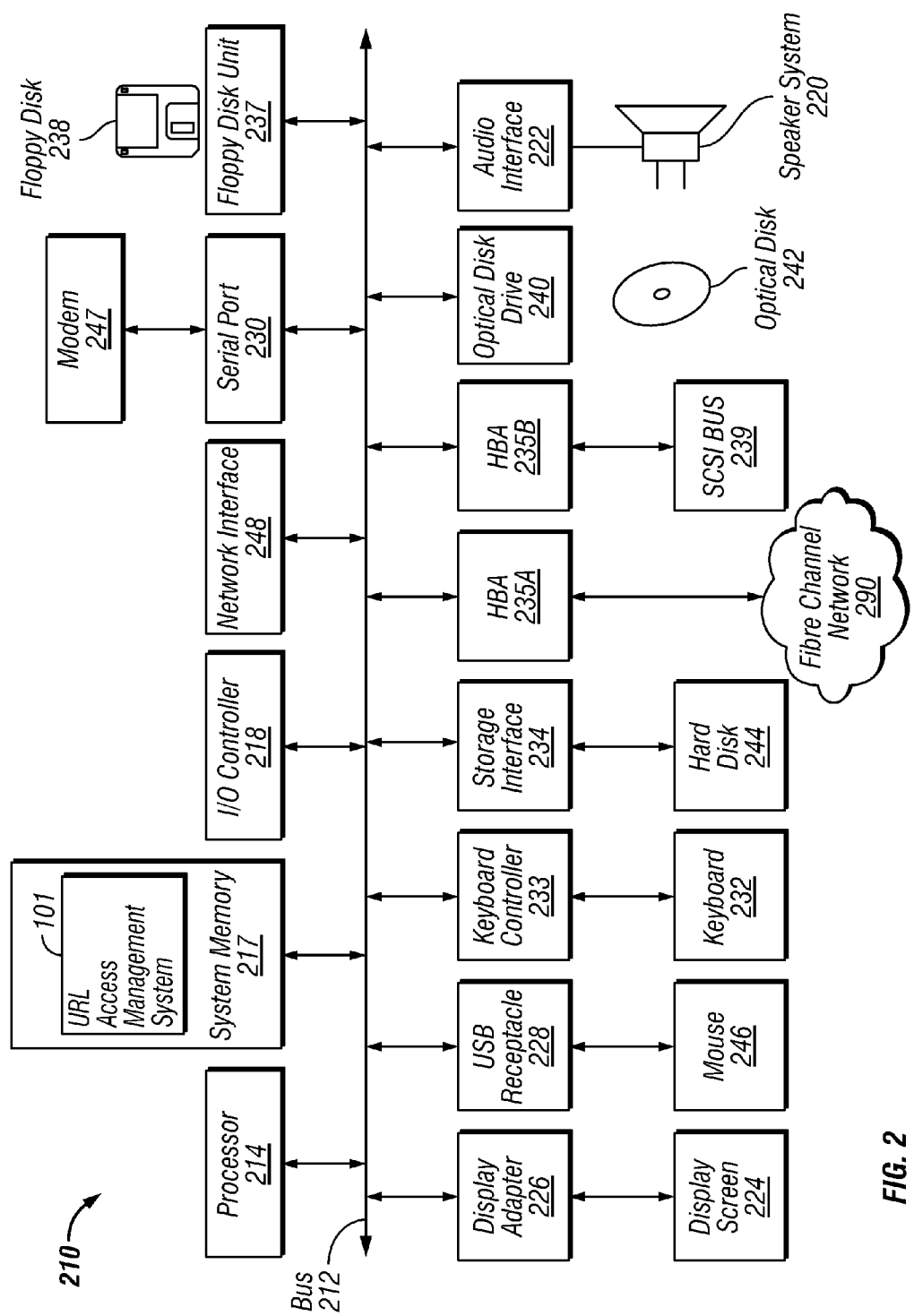
FIG. 2 is a block diagram of a computer system suitable for implementing a URL access management system, according to some embodiments.

FIG. 2 is a block diagram of a computer system 210 suitable for implementing a URL access management system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/ or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the URL access management system 101 is illustrated as residing in system memory 217. The workings of the URL access management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
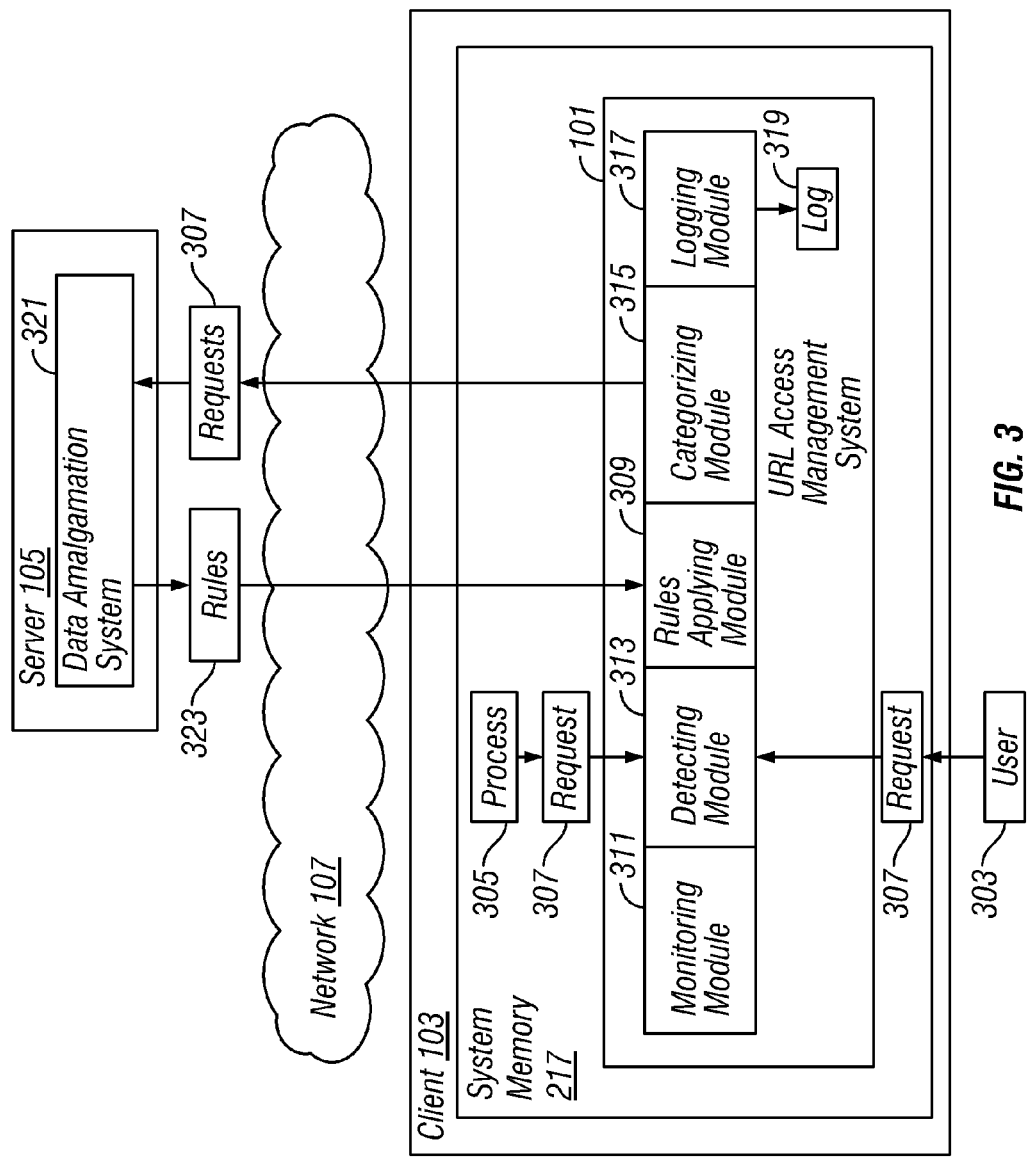
FIG. 3 is a block diagram of the operation of a URL access management system, according to some embodiments.

FIG. 3 illustrates the operation of a URL access management system 101 residing in the system memory 217 of a client computer 103, according to some embodiments. As described above, the functionalities of the URL access management system 101 can reside on a client 103, a server 105, or be distributed between multiple computer systems 210, including within a cloud-based computing environment in which the functionality of the URL access management system 101 is provided as a service over a network 107. It is to be understood that although the URL access management system 101 is illustrated in FIG. 3 as a single entity, the illustrated URL access management system 101 represents a collection of functionalities, which can be instantiated as a single or multiple modules as desired (an instantiation of specific, multiple modules of the URL access management system 101 is illustrated in FIG. 3). It is to be understood that the modules of the URL access management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the URL access management system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, a URL access management system 101 differentiates URLs that are accessed by a human user 303 from those accessed by an automated process 305, on the client side, and in real-time. This reduces the size of the monitoring logs 319 (produced by, e.g., a content monitoring application such as a parental control system), thereby reducing the load on the logging components and avoiding the logging of information that is superfluous to the actual monitoring of the user 303.

As illustrated in FIG. 3, a network traffic monitoring module 311 of the URL access management system 101 monitors outbound network traffic originating from the client computer 103 operated by the user 303 being monitored. In some embodiments, the network traffic monitoring module 311 is implemented as an HTTP/HTTPS proxy, either local (as illustrated) or remote, configured or transparent. In other embodiments, the network traffic monitoring module 311 is implemented other ways, such as at a network protocol stack level.

The implementation mechanics of monitoring outbound network traffic are within the skill set of those of ordinary skill in the relevant art, and the usage thereof within the context of the present invention will be readily apparent to one of such a skill level in light of this specification.

In conjunction with the network traffic monitoring module 311 monitoring outbound network traffic originating from the client computer 103, a request detecting module 313 of the URL access management system 101 detects each HTTP request 307 to access a URL in the outbound network traffic. Whenever the request detecting module 313 detects such an HTTP request 307, it passes the request 307 to a rule applying module 309 of the URL access management system 101, to determine whether the request 307 was initiated manually by the user 303 or automatically by a process 305. It is to be understood that as used herein the term "HTTP request 307" can refer to either the actual request 307 itself or information concerning the request 307 (e.g., the requested URL, the time of the request 307, etc.).

In order to determine whether a given request 307 was initiated manually by the user 303 or automatically by a process 305, the rule applying module 309 applies rules 323 (the creation and distribution of rules 323 is described below) to the request 307. The rule applying module 309 tracks requests 307 to access URLs 307 over time, and compares each rule 323 to each request 307 to determine whether the rule 323 applies to the request 307. Each rule 323 that applies to a request 307 indicates a likelihood of the given request 307 being automatically or manually generated. Where a given rule 323 applies to a request 307 to access a URL, the given rule 323 does not by itself confirm the request 307 as being automatically generated, but instead indicates a given likelihood that this is the case. A URL categorizing module 315 of the URL access management system 101 categorizes each request 307 with a rating indicating its likelihood of being automatically generated, based on which rules 323 apply to the request 307, if any, and how those rules 323 are weighted (weighting of rules 323 is discussed below). Where the rating of a request 307 reaches a given threshold, the URL categorizing module 315 categorizes the request 307 as being automatically generated.

It is to be understood that what threshold to use is a variable design parameter. It is further to be understood that categorization of requests 307 is described above in terms of rules 323 indicating a likelihood of a given request 307 being automatically generated, but in other embodiments the opposite approach can be taken. In other words, in some embodiments, rules 323 can indicate a likelihood that a request 307 was manually generated, and where the rating for a given request 307 reaches a given threshold, the request 307 is categorized as being manually generated.

The specific rules 323 can be based on a variety of factors that may indicate that a given URL is being accessed by an automated process 305. An example of such a factor is the speed with which a particular URL is being accessed. A human user 303 can access a URL every few seconds at most, whereas an automated process 305 can access the same URL many times a second. Thus, a given rule 323 could indicate that a request 307 is indicative of being generated automatically if a URL is requested multiple times within a relatively short time period (e.g., more than once every five seconds, more than once a second, more than ten times per second, etc.). Another factor on which rules 323 can be based is the number of times one or more URL(s) 301 is(are) accessed over a longer time period (e.g., six hours, twelve hours, one day). For example, a human user 303 can access at most a few hundred URLs in a day. An automated process 305, on the other hand, may access the same (or multiple) URLs thousands of times per day. Yet another factor is the interval between and regularity of requests 307. A URL that is requested at a regular interval (e.g., every five minutes, every hour, once per day at the same time) or in conjunction with a regular event (e.g., every time a particular process 305 starts, on machine boot, etc.) is likely requested by an automated process 305.

A request 307 made to access a URL when the user 303 is idle (e.g., the mouse, keyboard and other user input devices are all idle, the screen saver is activated, etc.) is also indicative of having been made by an automated process 305, and a rule 323 could by based on this factor. Another factor on which rules 323 can be based is the origin of the request 307. More specifically, requests 307 to access URLs originating from any source other than a known browser are less likely to be user 303 initiated than those coming from a known browser. However, this is not a guarantee, because the user 303 could be using an obscure browser (or even a self-built one) to avoid being monitoring. Another factor is the content of the response to the request 307. If the content of the HTTP response is not HTML or a common mime-type such as image, document, etc., the request 307 is more likely to have been automatically generated, because responses in such non-standard formats indicate (but do not prove) that the response is for automated processing as opposed to human viewing. For example, an application may fetch an XML or protobuf manifest to determine whether an update is required.

The above factors are simply specific examples of the types of factors on which rules 323 can be based. As used herein, the term "rule" 323 means a description of one or more conditions or circumstances concerning a request 307 to access a URL. A rule 323 is considered to apply to a request 307 where the request 307 meets the condition(s) and/or circumstance(s) described by the rule 323. Which specific rules 323 to apply is a variable design parameter. Additionally, how to weigh each rule (i.e., to what extent to adjust the ranking for a specific request 307 based on it meeting a specific rule towards or away from a threshold) is also a variable design parameter. Typically, the more indicative of a request 307 being automated (or manual) a rule 323 is, the more highly it would be weighted.

The rules 323 to apply, as well as weights and thresholds, can all be adjusted and modified over time as desired. Note also that because the URL categorizing module 315 tracks requests 307 to access URLs 307 over time, patterns can be identified and used in request 307 categorization. For example, multiple instances of requests 307 for a particular URL meeting a given rule 323 over time can strengthen the confidence that the particular URL is being accessed automatically. By watching patterns in how URLs are accessed over time, the URL categorizing module 315 can categorize all requests 307 for certain URLs (e.g., those that are accessed excessively, rapidly, and/or from certain processes 305) as always (or under certain circumstances, e.g., whenever accessed by a given, non-browser process 305) as being automatic.

Note that in some embodiments, the rules 323 are derived by skilled individuals (e.g., developers) and distributed with the URL access management system 101 for use in the categorization of requests 307 to access URLs. In other embodiments, some or all rules 323 can be generated by a machine learning system based on empirical evidence gleaned over time, as described below in conjunction with FIG. 4. It is to be further understood that the rules applying module 309 and the URL categorizing module 315 can account for the fact that automated requests 307 to access URLs may be slightly different from time to time (e.g., different IDs appended to the end of the URL) on different requests 307. For this reason, during the application and categorization processes, these modules can examine subpaths and subdomains, as well as full URLs.

If the request 307 is categorized as having been initiated by the user 303, then the URL categorizing module 315 passes the request 307 to a logging module 317 of the of the URL access management system 101. The logging module 317 stores monitored user activity of interest in a log 319, including HTTP requests 307 to access URLs that are categorized as having been initiated manually by the user 303. This log 319 can be subsequently reviewed according to conventional monitoring application functionality. It is to be understood that although the logging module 317 and log 319 are illustrated as residing on the client 103, in other embodiments these components can reside on a server 105. Note that the URL categorizing module 315 passes only requests 307 categorized as having been made manually by the user 303 to the logging module 317, having the result that requests 307 categorized as having been made automatically are not logged.

By distinguishing requests 307 to access URLs manually by a user 303 from those made automatically by processes 305, the URL access management system 101 avoids logging automatically generated requests 307, and instead logs only those requests 307 categorized as being made manually by the user 303 being monitored. In some embodiments, where a request 307 is categorized as having been initiated automatically by a process 305, the URL categorizing module 313 passes the request 307 to a data amalgamation system 321, running on a central server 105, which is described in greater detail in conjunction with FIG. 4. In some embodiments, the logs 319 are also be passed to the data amalgamation system 321. Note that in some embodiments the logs 319 are maintained on the server 105, in which case the data amalgamation system 321 can access them directly. The data amalgamation system 321 can be thought of as a URL access management system 101 server side component.

Figure 4:
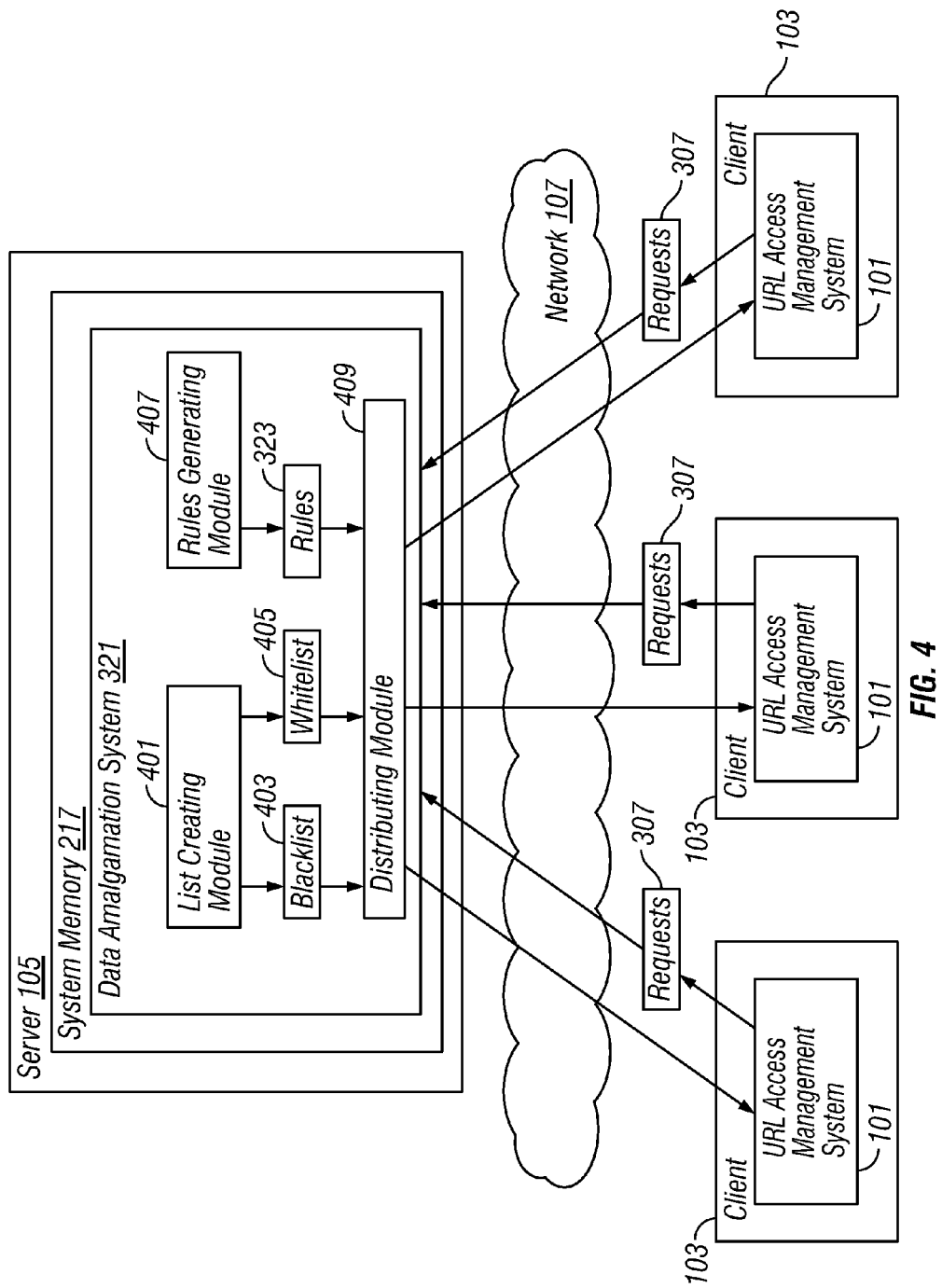
FIG. 4 is a block diagram of the operation of a data amalgamation system in conjunction with a URL access management system, according to some embodiments.

As illustrated in FIG. 4, the data amalgamation system 321 runs in the system memory 217 of a server 105, and receives input from a plurality of URL access management systems 101, running on a plurality of client computers 105 (only three are illustrated in FIG. 4 for ease of viewing, but in practice many more could be deployed). In other words, the data amalgamation system 321 receives information concerning requests 307 to automatically access URLs as categorized by multiple sources. A list creating module 401 of the data amalgamation system 321 can create a blacklist 403 of such URLs. A distributing module 409 of the data amalgamation system 321 can subsequently distribute the blacklist 403 to the plurality of URL access management systems 101, running on the plurality of client computers 105. On a client 103 that has received such a blacklist 403, the request detecting module 313 of the URL access management system 101 can then simply ignore requests 307 to access URLs that are on the blacklist 403, assuming these to be automatically generated requests 307. Note that in other embodiments, the data amalgamation system 321 can receive information concerning requests 307 to access URLs categorized as being manual. In such embodiments, a whitelist 405 of these URLs can be created and distributed instead of or in addition to the blacklist 403. In the case of a whitelist 405, the request detecting module 313 of the URL access management system 101 can simply assume requests 307 to access URLs that are on the whitelist 405 are manual requests 307. Updated blacklists 403 and/or whitelists 405 can be created and distributed as desired, as additional information is received from the plurality of URL access management systems 101.

Also illustrated as part of the data amalgamation system 321 running on the server 105 is a rules generating module 407 (in other embodiments, this component can be implemented at a client 103 level). The rules generating module 407 can generate rules 323 according to which a URL is adjudicated to be automatically or manually requested, as described above in conjunction with FIG. 3. In one embodiment, the rules generating module 407 is operated by one or more skilled individuals (e.g., developers, not illustrated) to generate rules 323 based on various factors, such as those described above in conjunction with the application of rules 323. Rules 323 generated in this way can be distributed to client computers 103 as part of the URL access management system 101. Additionally, the distributing module 409 can distribute new and/or updated rules 323 to URL access management systems 101 installed on client computers 103 in realtime, as desired.

In other embodiments, the rules generating module 407 applies machine learning and/or artificial intelligence techniques to gathered data concerning requests 307 for URLs received by the data amalgamation system 321 from the plurality of URL access management systems 101. By analyzing requests 307 for URL access made over time on a plurality of client computers 210, the rules generating module 407 can identify patterns in how URLs are accessed, and generate and update rules 323 based on this empirical data. It is to be understood that in some embodiments, developers and the like creating rules can also refer to the request 307 data received by the data amalgamation system 321 over time. In some embodiments, user logs 319 can be used as another source of information for generating rules 323. In any case, automatically generated and/or updated rules 323 can be distributed to client computers in the same ways as manually generated and/or updated rules 323, as described above.

Figure 5:
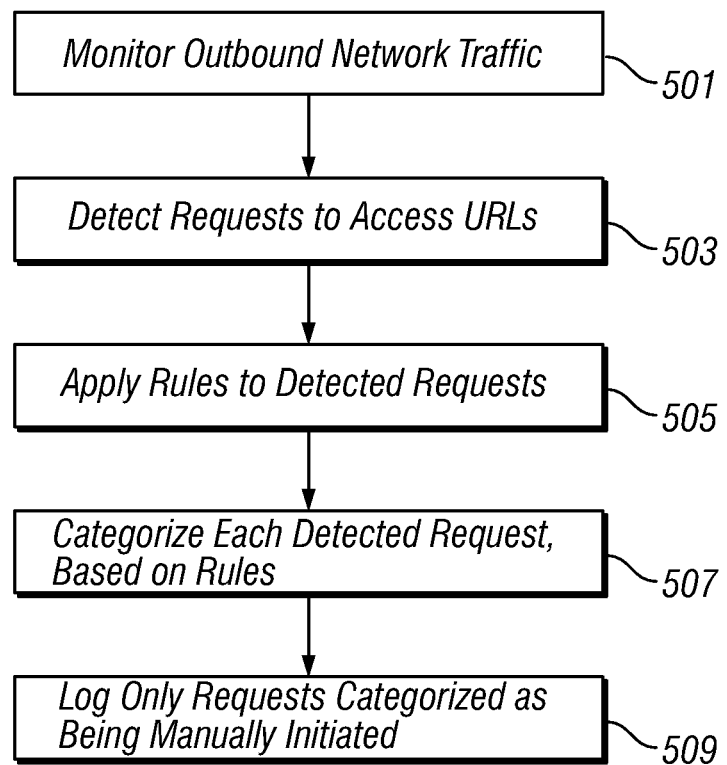
FIG. 5 is a flowchart of the operation of a URL access management system, according to some embodiments.

FIG. 5 illustrates steps for the operation of a URL access management system 101 (FIG. 1), according to some embodiments. As illustrated in FIG. 5, a network traffic monitoring module 311 (FIG. 3) of the URL access management system 101 (FIG. 1) monitors 501 outbound network traffic originating from a client computer 103 (FIG. 1) operated by a user 303 (FIG. 3). A request detecting module 313 (FIG. 3) of the URL access management system 101 (FIG. 1) detects 503 each HTTP request 307 (FIG. 3) to access a URL in the outbound network traffic. A rule applying module 309 (FIG. 3) of the URL access management system 101 (FIG. 1) applies 505 rules 323 (FIG. 3) to detected requests 307 (FIG. 3). A URL categorizing module 315 (FIG. 3) of the URL access management system 101 (FIG. 1) categorizes 507 each request 307 (FIG. 3) as being automatically initiated or manually initiated, based on which rules 323 (FIG. 3) apply to the request 307 (FIG. 3), if any. A logging module 317 (FIG. 3) of the URL access management system 101 (FIG. 1) logs 509 only requests 307 (FIG. 3) to access URLs categorized as having been initiated manually by the user 303 (FIG. 3).

Figure 6:
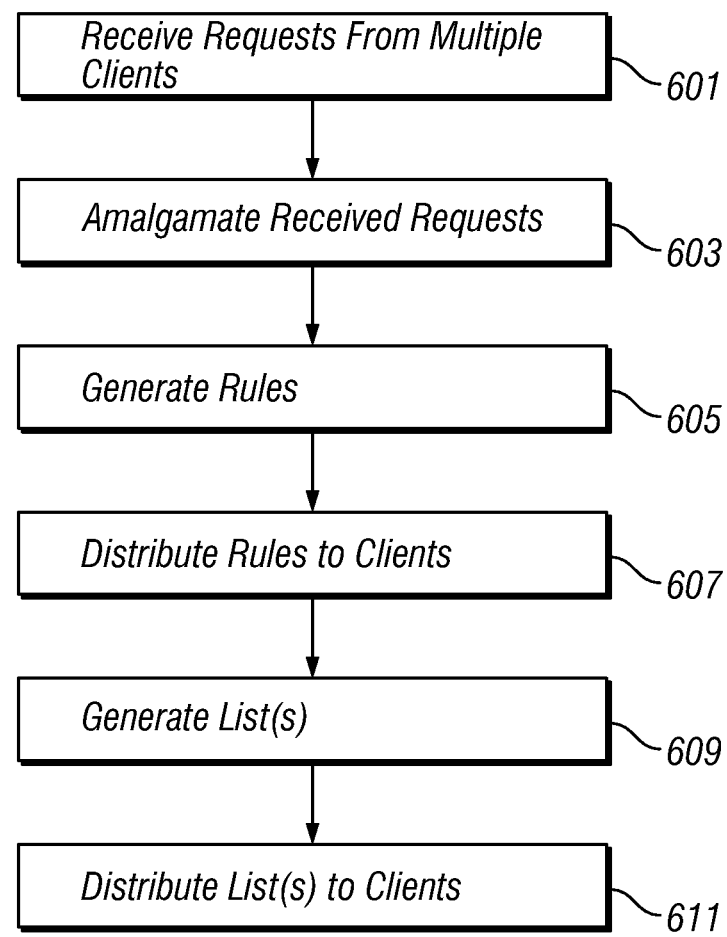
FIG. 6 is a flowchart of the operation of a data amalgamation system in conjunction with a URL access management system, according to some embodiments.

FIG. 6 illustrates steps for the operation of a data amalgamation system 321 (FIG. 3) in conjunction with a URL access management system 101 (FIG. 1), according to some embodiments. The data amalgamation system 321 (FIG. 3) runs on a server computer 105 (FIG. 1), and receives 601 information concerning categorized requests 307 (FIG. 3) to automatically access URLs from a plurality of URL access management systems 101 (FIG. 1), running on a plurality of client computers 103 (FIG. 1). The data amalgamation system 321 (FIG. 3) amalgamates 603 categorized requests 307 (FIG. 3) received from the plurality of client computers 103

(FIG. 1). A rules generating module 407 (FIG. 4) of the data amalgamation system 321 (FIG. 3) generates 605 rules 323 (FIG. 3), based on the amalgamated categorized requests 307 (FIG. 3). A distributing module 409 (FIG. 4) of the data amalgamation system 321 (FIG. 3) distributes 607 generated rules 323 (FIG. 3) to the plurality of client computers 103 (FIG. 1). A list creating module 401 (FIG. 4) of the data amalgamation system 321 (FIG. 3) creates 609 a blacklist 403 (FIG. 4) and/or a whitelist 405 (FIG. 4) of categorized URLs. The distributing module 409 (FIG. 4) distributes 611 the created blacklist 403 (FIG. 4) and/or whitelist 405 (FIG. 4) to the plurality of client computers 103 (FIG. 1).

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for identifying requests to access URLs that are made automatically by processes, the method comprising the steps of:
    monitoring, by a computer, outbound network traffic originating from a client computer;
    detecting requests to access URLs in the outbound network traffic, by a computer;
    comparing a plurality of rules to detected requests to access URLs, by a computer, in order to determine whether specific ones of the detected requests were initiated automatically by at least one computerized process as opposed to manually by a human user;
    responsive to a rule of the plurality applying to a specific detected request, adjusting a rating concerning the specific detected request, by a computer, the rating indicating a likelihood as to whether the specific detected request was initiated automatically;
    categorizing, by a computer, some detected requests to access URLs as being initiated automatically, responsive to an associated rating indicating a likelihood as to whether the request was initiated automatically;
    categorizing, by a computer, some detected requests to access URLs as being initiated manually by a human user, responsive to an associated rating indicating a likelihood as to whether the request was initiated automatically; and
    at client side, logging, by a computer, only human user activity of interest comprising requests categorized as being manually initiated by the human user, while avoiding logging of information that is superfluous to monitoring of the human user.

2. The method of claim 1 further comprising:
    comparing each rule of the plurality to a specific detected request to access a URL, by a computer, in order to determine whether the specific detected request was initiated automatically;
    wherein adjusting a rating concerning the specific detected request comprises:
    for each rule of the plurality that applies to the specific detected request, adjusting the rating concerning the specific detected request, by a computer, the rating indicating a likelihood that the specific detected request was initiated automatically.

3. The method of claim 2 further comprising:
    categorizing, by a computer, the specific detected request as being initiated automatically by a process, responsive to the associated rating reaching a threshold.

4. The method of claim 2 further comprising:
    categorizing, by a computer, the specific detected request as being initiated manually by a human user, responsive to a relationship between the associated rating and a threshold.

5. The method of claim 1 wherein adjusting the rating concerning the specific detected request, by a computer, the rating indicating a likelihood as to whether the request was initiated automatically further comprises:
    adjusting, by a computer, the rating concerning the specific detected request responsive to a rate at which the URL of the specific detected request is being accessed over time.

6. The method of claim 1 wherein adjusting the rating concerning the specific detected request, by a computer, the rating indicating a likelihood as to whether the request was initiated automatically further comprises:
    adjusting, by a computer, the rating concerning the specific detected request responsive to a number of URLs that have been accessed within a given time period by the client computer.

7. The method of claim 1 wherein adjusting the rating concerning the specific detected request, by a computer, the rating indicating a likelihood as to whether the request was initiated automatically further comprises:
    adjusting, by a computer, the rating concerning the specific detected request responsive to a human user of the client computer being idle at the time of the specific detected request.

8. The method of claim 1 wherein adjusting the rating concerning the specific detected request, by a computer, the rating indicating a likelihood as to whether the request was initiated automatically further comprises:
    adjusting, by a computer, the rating concerning the specific detected request based on a source of the specific detected request.

9. The method of claim 1 wherein adjusting the rating concerning the specific detected request, by a computer, the rating indicating a likelihood as to whether the request was initiated automatically further comprises:
    adjusting, by a computer, the rating concerning the specific detected request responsive to a response to the specific detected request.

10. The method of claim 1 further comprising:
    responsive to categorizing a detected request as being initiated automatically by a process, transmitting, by a computer, the detected request to a central server for analysis.

11. The method of claim 1 further comprising:
    modifying at least one rule of the plurality, by a computer, in response to at least one pattern in requests to access URLs detected over a period of time.

12. The method of claim 1 further comprising:
automatically generating at least one rule of the plurality of rules, by a computer, responsive to data concerning categorized requests amalgamated from a plurality of client computers.

13. The method of claim 1 further comprising:
automatically generating a list of categorized URLs, by a computer, responsive to data concerning categorized requests amalgamated from a plurality of client computers.

14. At least one computer readable storage medium storing a computer program product for identifying requests to access URLs that are made automatically by processes, the computer program product comprising:
program code for monitoring outbound network traffic originating from a client computer;
program code for detecting requests to access URLs in the outbound network traffic;
program code for comparing a plurality of rules to detected requests to access URLs, in order to determine whether specific ones of the detected requests were initiated automatically by at least one computerized process as opposed to manually by a human user;
program code for, responsive to a rule of the plurality applying to a specific detected request, adjusting a rating concerning the specific detected request the rating indicating a likelihood as to whether the specific detected request was initiated automatically;
program code for categorizing some detected requests to access URLs as being initiated automatically, responsive to an associated rating indicating a likelihood as to whether the request was initiated automatically;
program code for categorizing some detected requests to access URLs as being initiated manually by a human user, responsive to an associated rating indicating a likelihood as to whether the request was initiated automatically; and
program code for, at client side, logging only human user activity of interest comprising requests categorized as being manually initiated by the human user, while avoiding logging of information that is superfluous to monitoring of the human user.

15. The computer program product of claim 14 further comprising:
program code for comparing each rule of the plurality to a specific detected request to access a URL, in order to determine whether the specific detected request was initiated automatically;
program code for adjusting, for each rule of the plurality that applies to the specific detected request, the rating concerning the specific detected request the rating indicating a likelihood that the specific detected request was initiated automatically;
program code for categorizing the specific detected request as being initiated automatically by a process, responsive to the associated rating reaching a threshold; and
program code for categorizing the specific detected request as being initiated manually by a human user, responsive to a relationship between the associated rating and a threshold.

16. The computer program product of claim 14 wherein the program code for adjusting the rating concerning the specific detected request further comprises program code for adjusting the rating concerning the specific detected request responsive to at least one factor from a group of factors consisting of:
a rate at which the URL of the specific detected request is being accessed over time;
a number of URLs that have been accessed within a given time period by the client computer;
a human user of the client computer being idle at the time of the specific detected request;
a source of the specific detected request; and
a response to the specific detected request.

17. The computer program product of claim 14 further comprising:
program code for, responsive to categorizing a detected request as being initiated automatically by a process, transmitting the detected request to a central server for analysis.

18. The computer program product of claim 14 further comprising:
program code for modifying at least one rule of the plurality, in response to at least one pattern in requests to access URLs detected over a period of time.

* * * * *